US012750546B2

(12) United States Patent
Noskin et al.

(10) Patent No.: US 12,750,546 B2
(45) Date of Patent: Sep. 29, 2026

(54) SYSTEM AND METHOD FOR DYNAMIC PROFILE PHOTOS

(71) Applicant: Lemon Inc., Grand Cayman (KY)

(72) Inventors: Dan Noskin, Culver City, CA (US); Jiacheng Yang, Culver City, CA (US); Bo Yang Hu, Culver City, CA (US); Shouhan Gao, Culver City, CA (US); Vishnuvardhan Tanguturi, Culver City, CA (US); Yunjiu Li, Los Angeles, CA (US); Yaxi Gao, Los Angeles, CA (US); Zhili Chen, Los Angeles, CA (US); Yiheng Zhu, Los Angeles, CA (US); Yuxi Zhang, Los Angeles, CA (US); Chaoran Huang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 129 days.

(21) Appl. No.: 18/700,807

(22) PCT Filed: Sep. 28, 2022

(86) PCT No.: PCT/SG2022/050698

§ 371 (c)(1),
(2) Date: Apr. 12, 2024

(87) PCT Pub. No.: WO2023/063878

PCT Pub. Date: Apr. 20, 2023

(65) Prior Publication Data

US 2024/0419309 A1 Dec. 19, 2024

Related U.S. Application Data

(63) Continuation of application No. 17/500,762, filed on Oct. 13, 2021, now abandoned.

(51) Int. Cl.
*G06F 3/048* (2013.01)
*G06F 3/0484* (2022.01)
(Continued)

(52) U.S. Cl.
CPC ............ *G06F 3/0484* (2013.01); *G06V 20/50* (2022.01); *H04L 67/306* (2013.01)

(58) Field of Classification Search
CPC ...... G06F 3/0484; G06V 20/50; H04L 67/306
See application file for complete search history.

(56) References Cited

U.S. PATENT DOCUMENTS

| | | | | |
|---|---|---|---|---|
| 9,741,147 | B2 * | 8/2017 | Allen | G06T 13/40 |
| 10,225,602 | B1 * | 3/2019 | Sirpal | H04N 21/482 |

(Continued)

FOREIGN PATENT DOCUMENTS

| | | | |
|---|---|---|---|
| CN | 112749357 | A | 5/2021 |
| JP | 2008520011 | A | 6/2008 |

OTHER PUBLICATIONS

Communication Pursuant to Rules 70(2) and 70a(2) EPC for European Application No. 22881469.5, mailed Nov. 12, 2024, 1 page.

(Continued)

*Primary Examiner* — David Phantana-angkool

(57) ABSTRACT

Systems and methods for managing a presentation of a dynamic profile photo are provided. In particular, a server may receive contextual information associated with one or more users. The server may determine that the contextual information is consistent with a predetermined contextual action. In some examples, the server may identify a dynamic profile photo associated with the predetermined contextual information; and present, in response to the determination (Continued)

that the contextual information is consistent with the predetermined contextual action, the dynamic profile photo to the one or more users.

20 Claims, 14 Drawing Sheets

(51) Int. Cl.
*G06V 20/50* (2022.01)
*H04L 67/306* (2022.01)

(56) References Cited

U.S. PATENT DOCUMENTS

| | | | |
|---|---|---|---|
| 10,360,716 | B1 | 7/2019 | van der Meulen et al. |
| 10,860,199 | B2 * | 12/2020 | Schobel ................ G06F 3/0485 |
| 11,169,667 | B2 * | 11/2021 | Kogan .................... H04L 51/10 |
| 11,243,670 | B2 * | 2/2022 | Hirano .................... H04L 51/04 |
| 11,287,952 | B2 * | 3/2022 | Zhang ................... G06F 3/0486 |
| 12,445,736 | B2 * | 10/2025 | Rivard ................... H04N 23/74 |
| 2009/0128567 | A1 | 5/2009 | Shuster et al. |
| 2011/0209198 | A1 | 8/2011 | Blattner et al. |
| 2015/0033187 | A1 * | 1/2015 | Xu ...................... G06F 3/04817 715/822 |
| 2015/0350125 | A1 * | 12/2015 | Henderson .......... G06F 3/04842 715/753 |
| 2016/0300379 | A1 | 10/2016 | Du et al. |
| 2017/0031886 | A1 * | 2/2017 | Dave ................... G06F 16/9535 |
| 2018/0095606 | A1 | 4/2018 | Chae et al. |
| 2018/0213056 | A1 * | 7/2018 | Chau ..................... H04L 51/063 |
| 2019/0325201 | A1 | 10/2019 | Gujral et al. |
| 2020/0117344 | A1 * | 4/2020 | Weldemariam ..... G06F 16/5854 |
| 2021/0248804 | A1 | 8/2021 | Hussen Abdelaziz et al. |
| 2025/0014089 | A1 * | 1/2025 | McClure ............... H04L 67/306 |
| 2025/0071430 | A1 * | 2/2025 | Rivard ................... H04N 23/74 |

OTHER PUBLICATIONS

International Search Report issued May 25, 2023 in International Application No. PCT/SG2022/050698 (4 pages).
Notice of Allowance for U.S. Appl. No. 18/436,884, mailed Apr. 8, 2025, 12 pages.
Office Action in Japanese Applicationn. No. 2024-522404, dated Apr. 30, 2025, 9 pages (with English translation).
Extended European Search Report for European Application No. 22881469.5, mailed Oct. 25, 2024, 9 pages.
Notice of Allowance received for Japanese patent application No. 2024-522404 mailed on Mar. 24, 2026, 3 pages (Original document only).

* cited by examiner

SYSTEM AND METHOD FOR DYNAMIC PROFILE PHOTOS

CROSS-REFERENCE TO RELATED APPLICATIONS

This application is a national stage application filed under 35 U.S.C. 371 based on International Patent Application No. PCT/SG2022/050698, filed Sep. 28, 2022, which claims priority to U.S. application Ser. No. 17/500,762, entitled SYSTEM AND METHOD FOR DYNAMIC PROFILE PHOTOS, filed on Oct. 13, 2021, the entire contents of that application being incorporated herein by reference in its entirety.

BACKGROUND

User profile photos are widely used in various applications to provide users with means for identification and/or personalization of profile information. However, oftentimes the options for profile photos provided by the applications are limited to a single profile photo and require manual input from users to change from one profile photo to another. Hence, there remains a need to provide options for personalizing profile photos to enhance a user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for managing a presentation of a dynamic profile photo is described. The method may include receiving contextual information associated with one or more users and determining that the contextual information is consistent with a predetermined contextual action. In examples, the method further includes identifying a dynamic profile photo associated with the predetermined contextual information; and presenting, in response to the determination that the contextual information is consistent with the predetermined contextual action, the dynamic profile photo to the one or more users.

In accordance with at least one example of the present disclosure, a computing device for presenting a dynamic profile photo is described. The computing device may include a processor and a memory having a plurality of instructions stored thereon that, when executed by the processor, causes the computing device to: receive contextual information associated with one or more users; determine that the contextual information is consistent with a predetermined contextual action; identify a dynamic profile photo associated with the predetermined contextual information; and present, in response to the determination that the contextual information is consistent with the predetermined contextual action, the dynamic profile photo to the one or more users.

In accordance with at least one example of the present disclosure, a non-transitory computer-readable medium is described. The non-transitory computer-readable medium may store instructions for presenting a dynamic profile photo, the instructions when executed by one or more processors of a computing device, cause the computing device to: receive contextual information associated with one or more users; determine that the contextual information is consistent with a predetermined contextual action; identify a dynamic profile photo associated with the predetermined contextual information; and present, in response to the determination that the contextual information is consistent with the predetermined contextual action, the dynamic profile photo to the one or more users.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
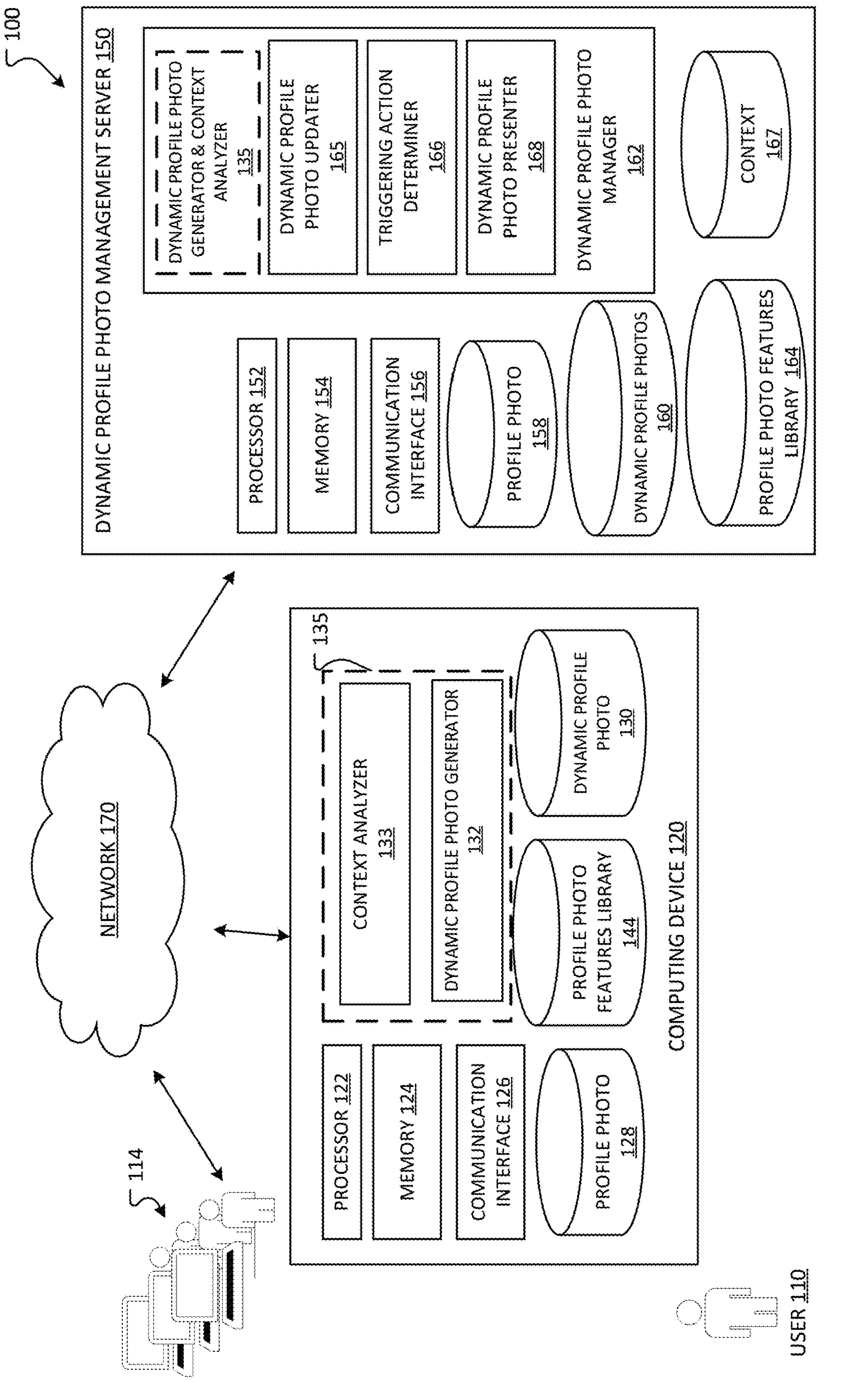
FIG. 1 depicts an example dynamic profile photo management system in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a dynamic profile photo management system allows users to create and/or utilize dynamic profile photos for various applications, where the dynamic profile photo management system may utilize context to determine when and how a dynamic profile photo changes. The dynamic profile photo management system may allow a user to create and/or select custom dynamic profile photos with custom expression and/or animations in real-time and/or offline. The dynamic profile photos may be used to interact with other users and/or indicate status, attentiveness, or reactions to other users and/or a user to which the dynamic profile photo belongs. To do so, some dynamic profile photos may be associated with certain actions, certain context, and/or certain timed events. For example, a user's profile picture may show a different dynamic photo based on an action triggered by another user and/or based on other context. As an example, when a host user uploads content (e.g., a post, a video clip), other users may interact with the content by pressing a like button on the content (e.g., within a host user feed). When a user likes the content, the user may see an automatic change in a profile picture of the host to a particular dynamic profile photo of the host that is associated with the like action. In some examples, the dynamic profile photo may be in response to the like button in addition to one or more other comments made by another user(s). In such an example, the profile photo of the host may return to a static profile photo after the dynamic profile photo has been played. In other instances, a dynamic profile photo may bring a realist or lifelike appearance to the profile photo by mimicking or otherwise displaying one or more human emotions based on an overall context of an environment to which the dynamic profile photo is to be displayed or otherwise associated with. For example, if an amount of time has passed since a host has posted content or otherwise interacted with an application and/or environment, such as in a comment section or chat window, a dynamic profile photo may appear to blink, breathe, sigh, appear board or non-interactive, look at its watch etc.

In other aspects, the users may use personalized dynamic profile photos of their own as predefined dynamic profile photos; in some instances, the personalized dynamic profile photo may be presented when messaging other users or replying to messages. Additionally, the dynamic profile photos may be used to react to a message received from other users. For example, if a user receives a smiley face emoji from another user, a dynamic profile photo of the user may automatically be sent to another user or otherwise displayed to the other user.

In other examples, a facial expression of the dynamic profile photo may be driven by the face of the real host user. For example, a camera or other device may acquire an image of the user and use the image of the user to base or otherwise select a dynamic profile photo for display to the host user and/or other users. In other words, the dynamic profile photo management system allows users to record and playback personalized dynamic profile photos to interact with other users in real-time.

FIG. 1 depicts dynamic profile management system 100 for acquiring a personalized dynamic profile photo and/or providing a dynamic profile photo to another user in accordance with examples of the present disclosure. To do so, a user 110 may generate a dynamic profile photo based on a selected user avatar. For example, the user 110 may select a user avatar from the profile photo repository 128, where the selected user avatar may exhibit a base set of features or facial expressions which may be customized by selecting one or more features from the profile photo features library 144. For example, a feature selection tool may assist a user in selecting one or more dynamic profile features; such features may correspond to a smile, a size of a smile, eye movements, body movements, etc. Thus, the dynamic profile management system 100 may include a computing device 120 associated with the user 110 and dynamic photo management server 150 that is communicatively coupled to the computing device 120 via a network 170. The network 170 may include any kind of computing network including, without limitation, a wired or wireless local area network (LAN), a wired or wireless wide area network (WAN), and/or the Internet. The computing device 120, although depicted as a desktop computer in FIG. 1 for example, may be any one of a portable or non-portable computing device. For example, the computing device 120 may be a smartphone, a laptop, a desktop, a server, a wearable electronic device, an intelligent home appliance, etc.

The user 110 may utilize the computing device 120 to generate a profile photo and/or one or more dynamic profile photos in accordance with examples of the present disclosure. To do so, the computing device 120 may include a communication interface 126, a processor 122, and a computer-readable storage 124. In examples, the communication interface 126 may be coupled to the network 170 and receive and/or access a profile photo repository 128/158, a dynamic profile photo repository 130/160, and/or a profile photo features library 144 and/or 164. The user 110 may select one or more features from the profile photo features library 144 or 164 to generate a profile photo 128/158. It should be appreciated that, in some aspects, the user 110 may generate multiple profile photos that are associated with the user. To do so, the computing device 120 is configured to provide a profile photo feature selection tool that includes one or more dynamic photo features to the user 110, which are stored in the profile photo features library 144/164. For example, the computing device 120 may communicate with the dynamic photo management server 150 to access a profile photo features library 164 stored at the dynamic photo management server 150 via the network 170. Additionally, or alternatively, the profile features library may be downloaded onto the computing device 120 and stored in a profile photo features library 144. In such examples, the computing device 120 may access the profile photo features library 144. As an example, the one or more profile photo features may include any facial features or shapes (e.g., a head, hair, eyes, eyebrows, nose, mouth, ears, and wrinkles) and any accessories that may be put on the facial features (e.g., glasses, a hat, earrings, and a nose ring). It should be appreciated that some profile photo features may be preselected as a default. Once the profile photo is created, the profile photo may be stored in the profile photo repository 128. Additionally, the computing device 120 may be configured to transmit the profile photo to the dynamic photo management server 150 to be stored in the profile photo repository 158.

Additionally, the user 110 may further utilize the computing device 120 to generate one or more dynamic profile photos. To do so, the computing device 120 may include one or more applications provided by the computing device 120 for interaction by a user. In an illustrative aspect, the one or more applications may include a dynamic profile photo generator 132, which allows a user to attach, apply, or otherwise generate one or more dynamic profile photos based on a profile photo. In examples, a dynamic profile photo may be generated by the dynamic profile photo generator and context analyzer 135, which includes the dynamic profile photo generator 132, based on one or more contexts, where the one or more contexts may be analyzed in real-time or otherwise selected from a predefined context type. For example, a context analyzer 133 may determine a context associated with an environment, application, app, or program in which a user is currently engaged with or otherwise displayed to a display device of the computing device 120. The context analyzer 133, for example, may determine that a dynamic profile photo that reflects a user smiling, being excited, winking, etc. should be generated based on the analyzed context. Accordingly, a context determination may be provided to the dynamic profile photo generator 132 such that the dynamic profile photo generator 132 may generate a dynamic profile photo based on the context or otherwise the context determination. In some examples, the dynamic profile photo generator 132 may associate the generated dynamic profile photo with the context or determined context and store the dynamic profile photo in the dynamic profile photo repository 130. In some examples, the dynamic profile photo, either recently generated or otherwise retrieved from the dynamic profile photo repository 130, may be provided to an application, app, program, or other environment in which a user, such as a host user, interacts.

In accordance with some examples of the present disclosure, the computing device 120 may provide the dynamic profile photo to the dynamic profile photo management server 150 where the dynamic profile photo management server 150 may store the dynamic profile photo in the dynamic profile photo repository 160. In other examples, the dynamic profile photo management server 150 may generate a dynamic profile photo using the dynamic profile photo generator and context analyzer 135. For example, the dynamic profile photo generator of the dynamic profile photo generator and analyzer 135 may generate a dynamic profile photo based on one or more contexts, where the one or more contexts may be analyzed in real-time or otherwise selected from a predefined context type. For example, a context analyzer of the dynamic profile photo generator and analyzer 135 may determine a context associated with an environment, application, app, or program in which a user is currently engaged with, displayed to a display device of the computing device 120, or otherwise an application associated with an active session identified by a session identifier at a host server. The context analyzer of the dynamic profile photo generator and context analyzer 135 for example, may determine that a dynamic profile photo that reflects a user smiling, being excited, winking, etc. should be generated based on the analyzed context. Accordingly, a context determination may be provided to the dynamic profile photo generator of the dynamic profile photo generator and analyzer 135 such that the dynamic profile photo generator of the dynamic profile photo generator and analyzer 135 may generate a dynamic profile photo based on the context or otherwise the context determination. In some examples, the dynamic profile photo generator of the dynamic profile photo generator and analyzer 135 may associate the generated dynamic profile photo with the context or determined context and store the dynamic profile photo in the dynamic profile photo repository 160. In some examples, the dynamic profile photo, either recently generated or otherwise retrieved from the dynamic profile photo repository 160, may be provided to an application, app, program, or other environment in which a user, such as a host user, interacts with and then may be displayed at a display device of the computing device 120. In some examples, the dynamic profile photo management server 150 may provide the dynamic profile photo to the computing device 120.

In some examples, the user 110 may interact with the dynamic profile photo management server 150 to generate one or more dynamic profile photos. To do so, dynamic profile photo management server 150 may include one or more applications provided by the dynamic profile photo management server 150 and/or computing device 120 for interaction with a user. In an illustrative aspect, the one or more applications may include a dynamic profile photo generator and context analyzer 135 as previously mentioned, which allows a user to attach, apply, or otherwise generate one or more dynamic profile photos based on a profile photo.

In some aspects, the dynamic profile photo generator 132 is configured to receive a request from a user 110 to generate a specific dynamic profile photo. If the user 110 has more than one profile photo and/or dynamic profile photo, the request may include an indication identifying a particular profile photo and/or dynamic profile photo to be used to generate a dynamic profile photo associated with the user 110.

In some examples, the dynamic profile photo generator and context analyzer 135 may be configured to record a user of the profile photo exhibiting custom facial expressions. For example, a dynamic profile photo may be associated with an avatar and may include an animation of the user avatar with the user's smiling facial expression. Additionally, in some aspects, the dynamic profile photo generator and context analyzer 135 may be configured to generate a dynamic profile photo based on the context of the application, environment, app, or otherwise. For example, while some dynamic profile photos may be based on predefined or preselected contexts (e.g., wink, smile, breath, look at watch, etc.), one or more dynamic profile photos may be based on recorded gestures such as, but not limited to, looking away, looking up, eye rolling, hand gestures, etc. In some examples, a dynamic profile photo may be generated according to one or more predefined effects within the environment, such as but not limited to, hearts, stars, tears, or confetti.

The triggering action determiner 166 is configured to associate a dynamic profile photo with context that triggers a playback of the dynamic profile photo. For example, the context that triggers the playback of the dynamic profile photo may include receiving a like on content, receiving a message, and/or receiving a gift during a live video. As an example, a dynamic profile photo with smiling or laughing facial expression may be associated with context determined to be a happy event. For example, a user may receive a message or comment that is generally positive in nature; accordingly, a dynamic profile photo associated with the user the reflects the positive context may be uploaded to a platform or otherwise presented to other users.

Thus, the dynamic profile photo updater 165 is configured to update or otherwise associated the dynamic profile photo with a profile of the user, where the dynamic profile photo is then associated with the context and/or contextual action. Moreover, the dynamic profile photo management server 150 is configured to monitor user interactions with objects that are uploaded to one or more databases that are associated with the dynamic profile photo management server 150 and manage dynamic profile photos of the user based on the user interactions. To do so, the dynamic profile photo management server 150 includes a communication interface 156, a processor 152, and a computer-readable storage 154. In examples, the communication interface 156 may be coupled to the network 170 and may communicate with one or more computing devices that are associated with the users to receive and/or transmit dynamic profile photos. The dynamic profile photos may be stored in a dynamic profile photo repository 160 and/or a profile photo may be stored in the profile repository 158. As described above, the dynamic profile photo management server 150 is configured to manage dynamic profile photos of the users. To do so, one or more applications may be provided by the dynamic profile photo management server 150. In the illustrative aspect, the one or more applications include the dynamic profile photo manager 162.

As previously mentioned, the dynamic profile photo generator and context analyzer 135 may be configured to record a user of the profile photo exhibiting custom facial expressions. Additionally, in some aspects, the dynamic profile photo generator and context analyzer 135 may be configured to generate a dynamic profile photo based on the context of the application, environment, app, or otherwise. The triggering action determiner 166 is configured to associate a dynamic profile photo with context that triggers a playback of the dynamic profile photo. The dynamic profile photo updater 165 is configured to update or otherwise associated the dynamic profile photo with a profile of the user, where the dynamic profile photo is then associated with the context and/or contextual action. The dynamic profile photo presenter 168 is configured to present a dynamic profile photo of a host user to another user (e.g., 114), who triggered an action or context that is associated with the dynamic profile photo.

It should be appreciated that, in the illustrative aspect, the associated dynamic profile photo may be automatically presented to the user who triggered the detected action or based on the analyzed context without receiving any a host input. In some examples, a context of the app, application, program, or environment in which a host user interacts may be analyzed or otherwise determined and then stored in the context repository 167. In some examples, if a visiting user likes a video clip posted by a host user, the dynamic profile photo presenter 168 may automatically present a dynamic profile photo associated with the host user that is associated with the context or action to the visiting user. In other words, an automatic playback of the dynamic profile photo is presented to the visiting user based on the triggering context that is associated with the dynamic profile photo. In other example, if a visiting user sends a present to a host user while watching a live video of the host user, the dynamic profile photo presenter 168 may automatically present a dynamic profile photo of the host user that is associated with the context that includes the visiting user and the actions of the visiting user. It should be appreciated that, in some aspect, the dynamic profile photo presenter 168 may present an input option to the host user, such that the host user can manually send the dynamic profile photo to the guest user. For example, the input option may be embodied as an image or icon that appears on a display screen of a computing device of the host user. The image or icon may be a short cut to sending a particular dynamic profile photo of the host user that is associated with receiving a gift. In response, if the host user selects or touches the image or icon, the dynamic profile photo presenter 168 sends the dynamic profile photo of the host user to the guest user.

Figure 2A:
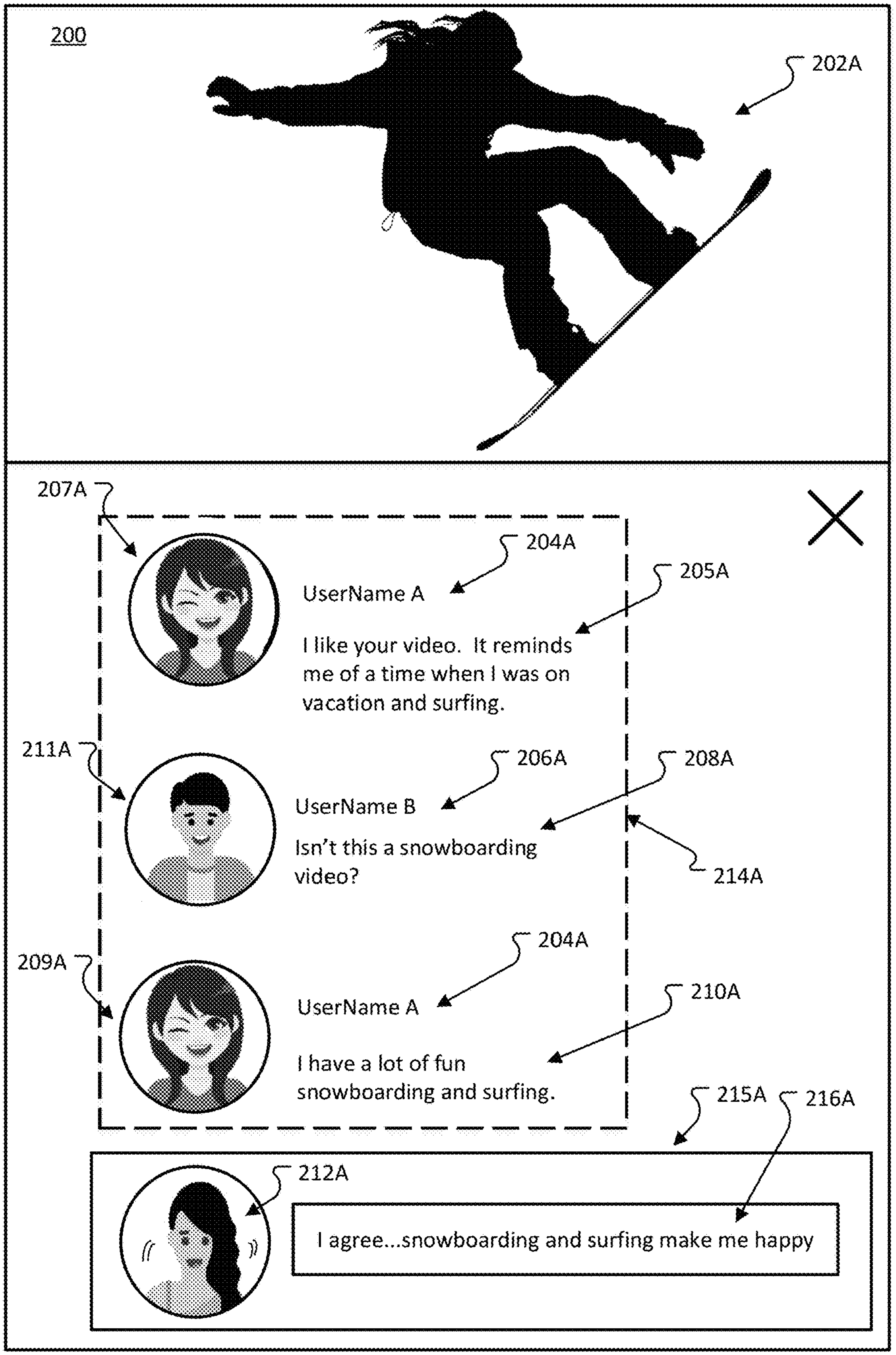
FIGS. 2A and 2B depict details of a first user interface in accordance with examples of the present disclosure.
Figure 2B:
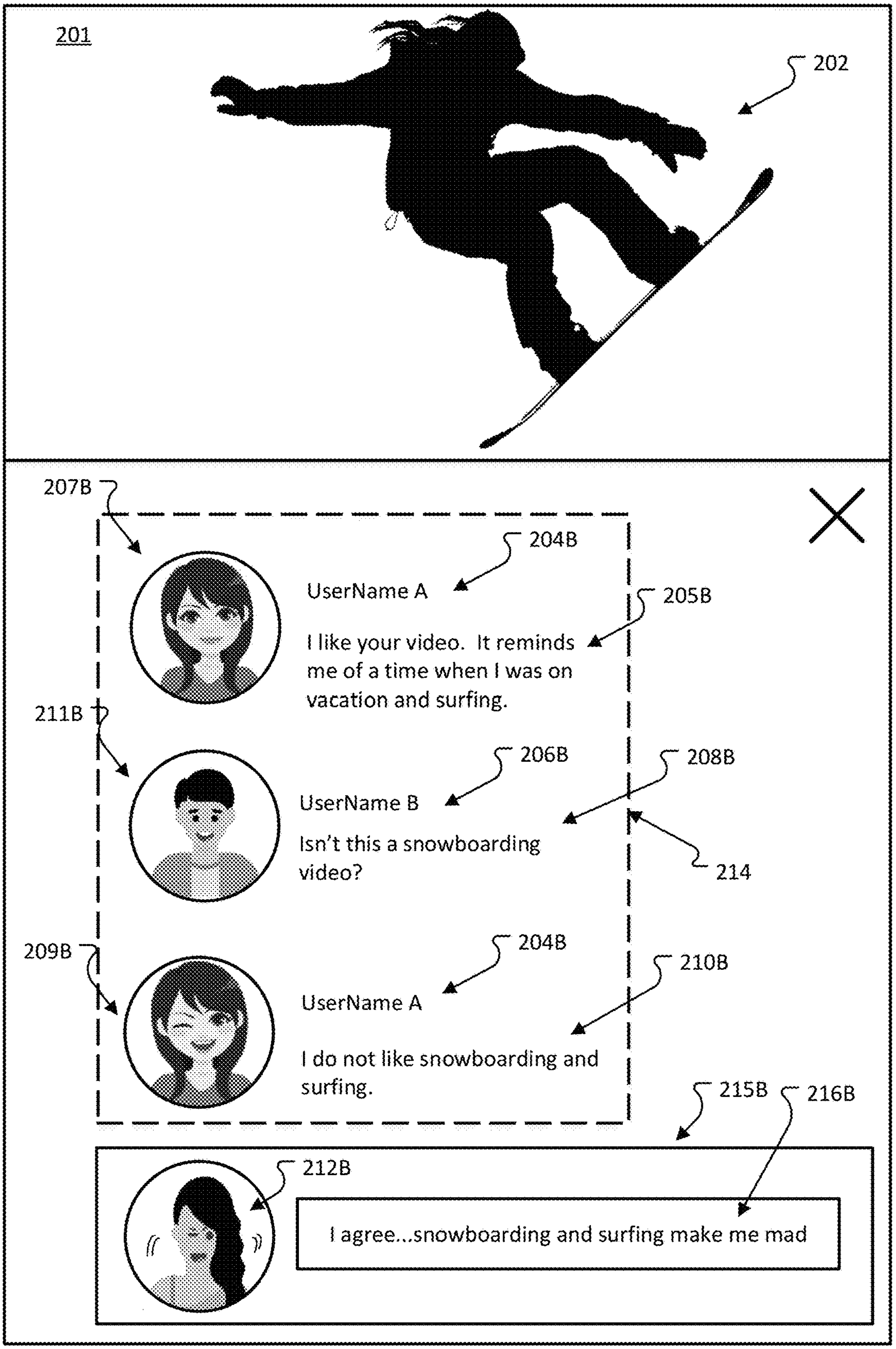

Referring now to FIGS. 2A-2B, example user interfaces 200 and 201 are displayed in accordance with examples of the present disclosure. As depicted in FIG. 2A, a user interface 200 may be displayed to a user; the user interface 200 may display an image or animated video clip 202A to which one or more users (e.g., 204, 206, 212) may view and provide a comment. As depicted in FIG. 2A, the user interface 200 may be associated with or otherwise be a user interface displayed to the user associated with the dynamic profile photo 212A. In a first example, a username 204A associated with a text comment 205A may be displayed; such username 204A and text comment 205A may be associated with a first example user. The first example user may have a dynamic profile photo 207A associated therewith. A username 206A associated with a text comment 208A may be displayed; such username 206A and text comment 208A may be associated with a second example user having a profile photo 211A. In some examples, the first example user may generate or leave another comment 210A. In some examples, the dynamic profile photo 209A associated with the first example user may change or be the same depending on a context of the application or user interface 200. In accordance with examples of the present disclosure, the context of the user interface 200 may include the usernames, profile photos, comments, etc., in the comment area 214A. In some examples, the context may also include one or more contextual elements of the image or video 202A. The context may be analyzed and a dynamic profile photo for a third example user, or host, associated with dynamic profile photo 212A may be selected and/or generated. In some examples, the context used to generate or select the dynamic profile photo 212A of the user host may be based on the comment 216A in the comment area 215A. As depicted in FIG. 2A, the dynamic profile photo 212A may be automatically selected and/or generated based on context.

As depicted in FIG. 2B, a user interface 201 may be displayed to a user; the user interface 201 may display an image or animated video clip 202B to which one or more users (e.g., 204, 206, 212) may view and provide a comment. As depicted in FIG. 2B, the user interface 201 may be associated with or otherwise be a user interface displayed to the user associated with the dynamic profile photo 212B. In a first example, a username 204B associated with a text comment 205B may be displayed; such username 204B and text comment 205B may be associated with a first example user. The first example user may have a dynamic profile photo 207B associated therewith. A username 206B associated with a text comment 208B may be displayed; such username 206B and text comment 208B may be associated with a second example user having a profile photo 211B. In some examples, the first example user may generate or leave another comment 210B. In some examples, the dynamic profile photo 209B associated with the first example user may change or be the same depending on a context of the application or user interface 201. In accordance with examples of the present disclosure, the context of the user interface 201 may include the usernames, profile photos, comments, etc., in the comment area 214B. In some examples, the context may also include one or more contextual elements of the image or video 202B. The context may be analyzed and a dynamic profile photo for a third example user, or host, associated with the dynamic profile photo 212B may be selected and/or generated. In some examples, the context used to generate or select the dynamic profile photo 212B of the user host may be based on the comment 216B in the comment area 215B. As depicted in FIG. 2B, the dynamic profile photo 212B may be automatically selected and/or generated based on context; such dynamic profile photo 212B may be different than the dynamic profile photo 212A of FIG. 2A.

Figure 3:
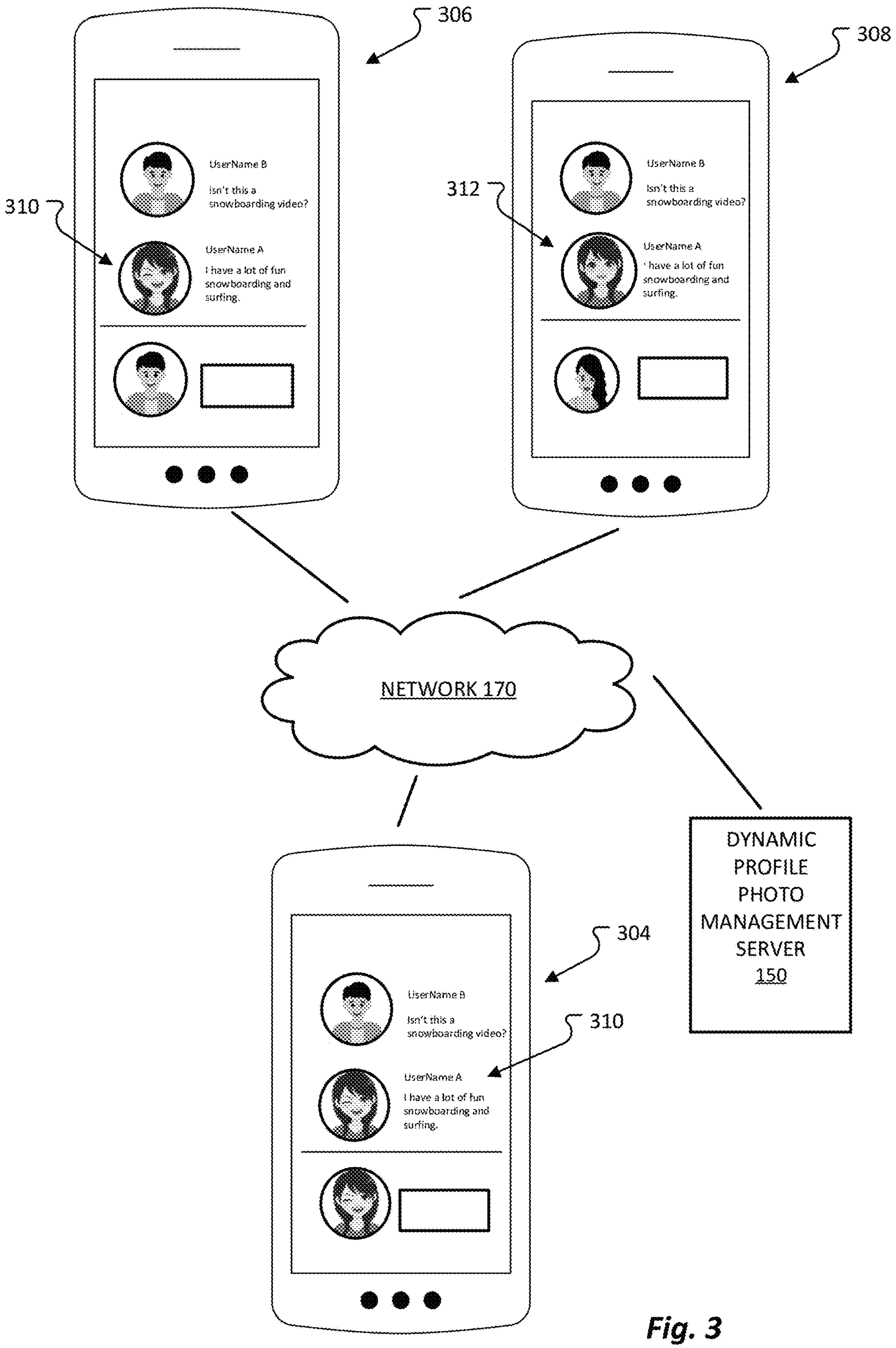
FIG. 3 depicts additional details of the dynamic profile photo management system in accordance with examples of the present disclosure.

FIG. 3 depicts an example of different user interface in accordance with examples of the present disclosure. In examples, a first example user may be associated with a device and user interface 304, a second example user may be associated with a device and user interface 306, and a third user example user may be associated with a device and user interface 308. Each device may communicate with one another via the network 310. In examples, the dynamic profile photo of each user may be different depending on context as previously discussed. As another example, users, devices, user groupings, etc. may be utilized when analyzing and/or determining a context associated with an environment with which a user interacts. For example, the a dynamic profile photo 312 associated with the first example user may be displayed at a display associated with the device and user interface 306 of the second example user; however, a different dynamic profile photo or in some instances a static profile photo 314 may be displayed at a different display associated with the device and user interface 308 belonging to the third example user. In examples, each of the dynamic profile photos may be generated by the dynamic profile photo management server 150 as previously described. Alternatively, or in addition, each of the dynamic profile photos may be generated by respective computing devices.

Figure 4A:
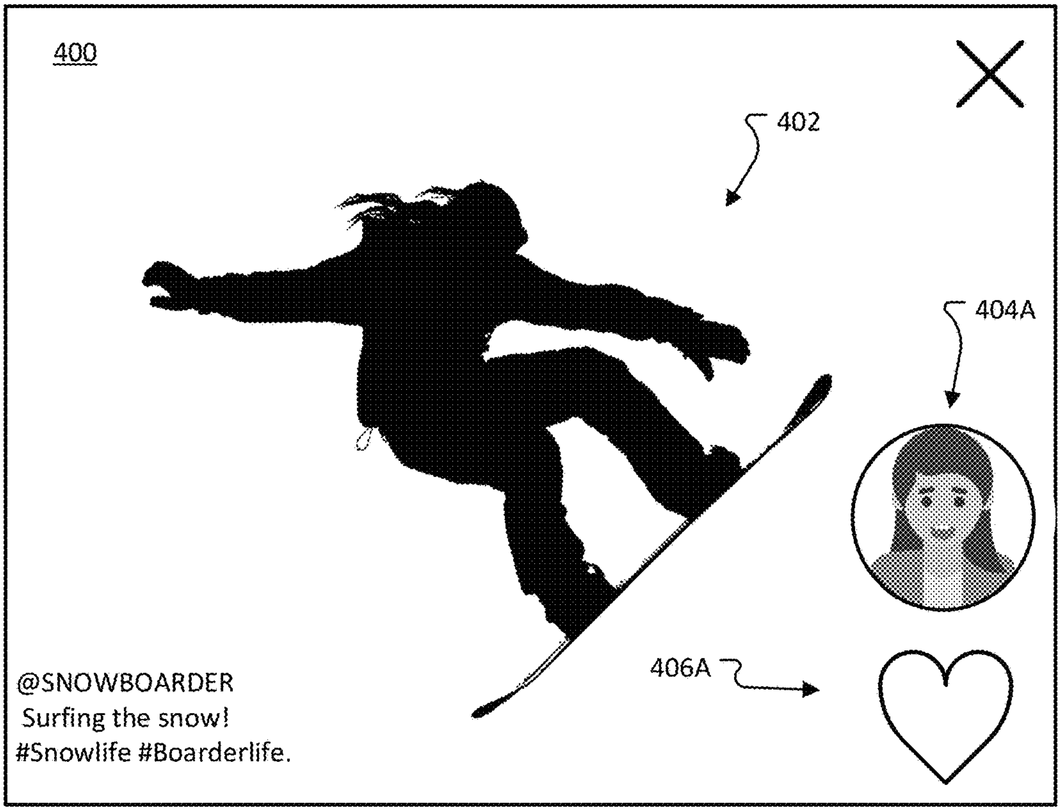
FIGS. 4A and 4B depict details of a second user interface in accordance with examples of the present disclosure.
Figure 4B:
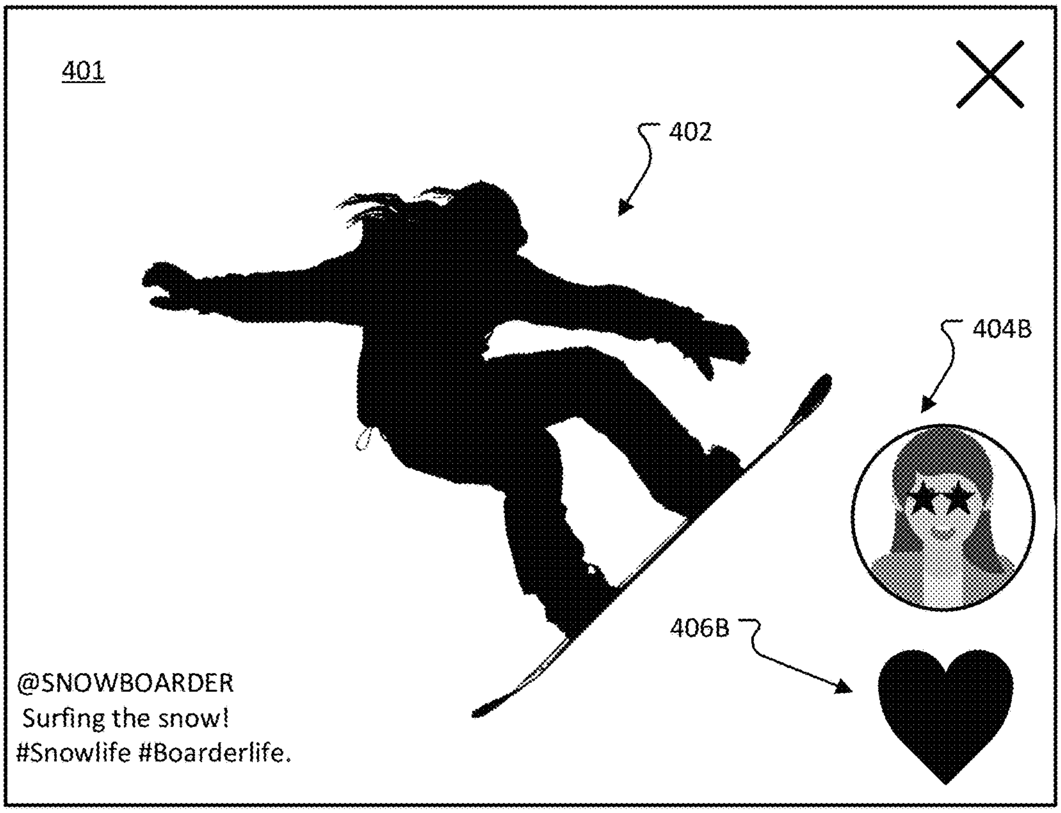

FIGS. 4A-4B depict additional examples of dynamic profile photos in accordance with examples of the present disclosure. More specifically, as depicted in FIG. 4A, a user interface 400 may include a video or image 402 and one or more controls 404A and 406A indicating whether a user is following the profile associated with the video or image 402. In examples, the first control 404A may display a profile photo of the user having the profile associated with the video or image 402. For example, the user may post the video or image 402 such that the video or image 402 is associated with the user profile. Accordingly, the profile photo of the user may be displayed in the control 404A. As depicted in FIG. 4B, the control 406B may indicate that the user viewing the video or image 402 has liked, or hearted, the video or image 402. Accordingly, based on the context associated with the user interface 401, a dynamic profile photo of the user may be displayed in the control 404B. The dynamic profile photo displayed in the control 404B is different from the profile photo displayed in the control 404.

Figure 5:
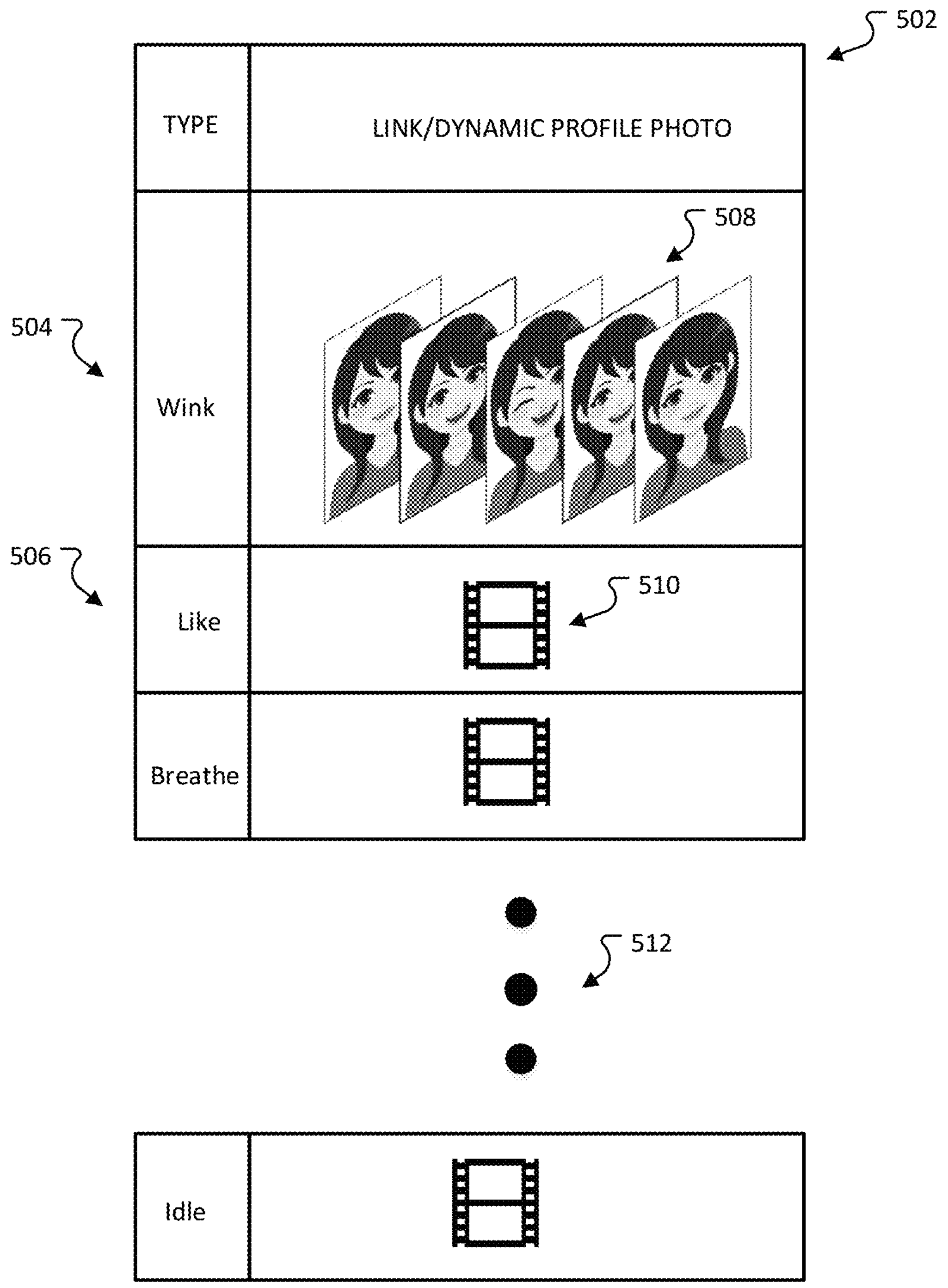
FIG. 5 depicts details associated with dynamic profile photos in accordance with examples of the present disclosure.

As depicted in FIG. 5, a dynamic profile photo may be associated with one or more actions and stored as a data structure 502. For example, a dynamic profile photo 508 may be associated with a wink 504 action. In examples, the dynamic profile photo 508 may represent a plurality of images forming a video or video clip. In some examples, one or more parameters may indicate whether the video or video clip is to repeat or loop, how many times it is to play, etc. As another example, a dynamic profile photo 510 may be associated with a like action 506. The ellipses 512 indicate that a plurality of dynamic profile photos may be associated with a plurality of different actions. Although the dynamic profile photos are depicted as being associated with a plurality of images or a video, the dynamic profile photo 508 for example, may indicate a model to be applied to a static profile photo. For example, a model for a wink action may be selected such that a wink dynamic profile photo is generated using a mode and a static image. Of course, other possibilities for generated dynamic profile photos are contemplated herein.

Figure 6:
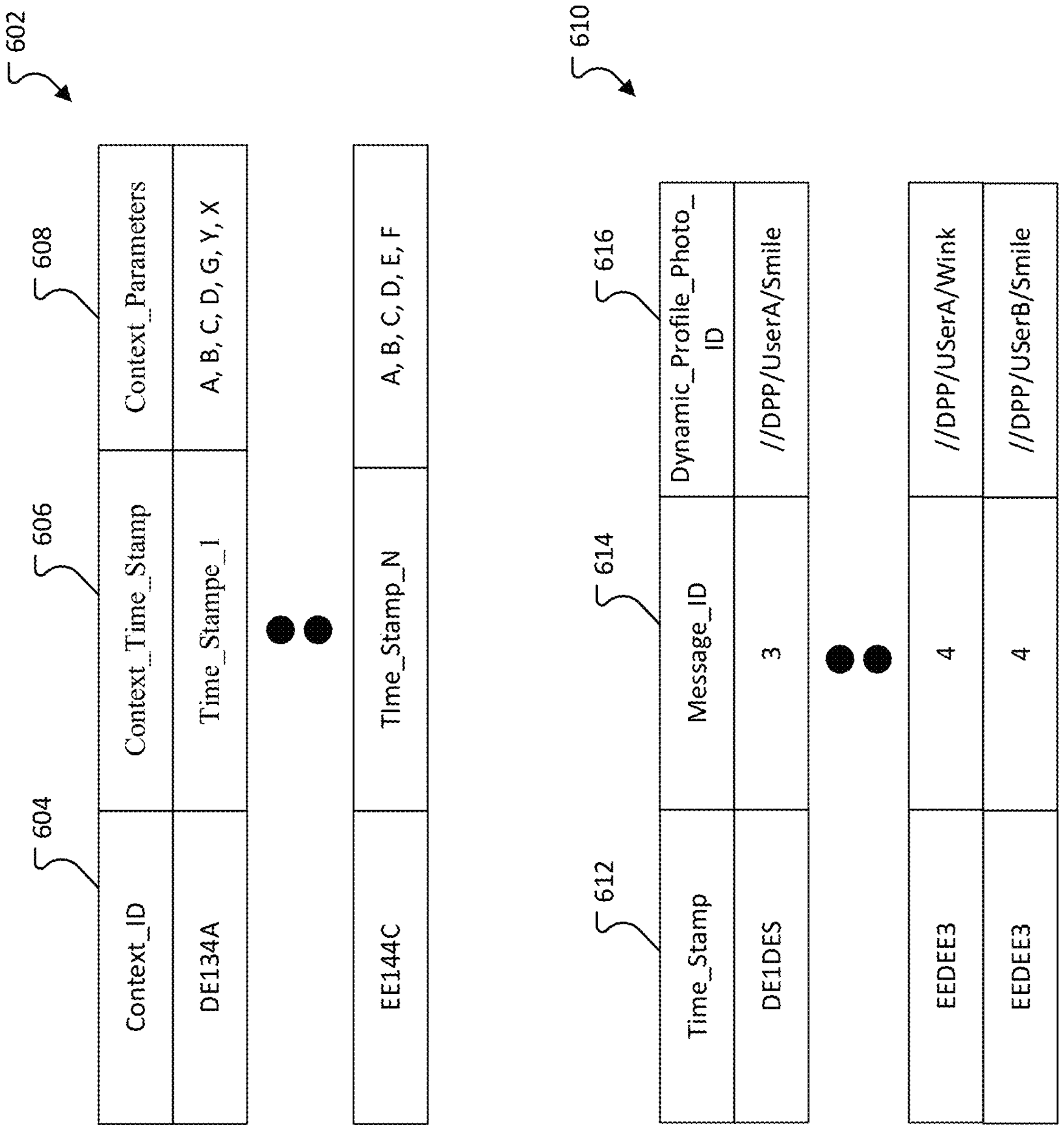
FIG. 6 depicts a data structure in accordance with examples of the present disclosure.

FIG. 6 depicts example data structures 602 and 610 in accordance with examples of the present disclosure. More specifically, the data structure 602 may associate one or more contexts with one or more context parameters present in an application, environment, or app as previously discussed. For example, a context of an application, app, environment, etc., may be analyzed and one or more context parameters 608 may be determined. The context parameters 608 may be utilized to identify or determine a context identifier 604, where the context identifier may be utilized to determine a dynamic profile photo action, such as a wink, like, etc. As an example, the context identifier 604 may be utilized to select or generate a dynamic profile photo associated with a user. In some examples, a timestamp 606 may also be associated with a context identifier.

In accordance with examples of the present disclosure, the a data structure 610 may be associated with an assignment of a dynamic profile photo to one or more user interface elements or controls, such as a message identifier 614. As another example, the one or more user interface elements or controls may correspond to a dynamic profile photo for a messaging session, a dynamic profile photo for a comment section, a dynamic profile photo for a control element, such as the control or element 404B in FIG. 4B, etc. The data structure 616 may associated a location or identifier of a dynamic profile photo with an element or control at a specific point in time, as indicated by the time stamp 612. Of course, the time stamp 612 may uniquely identify one or more elements or controls displayed to a user interface rather than just a time. Thus, upon display of a control or element, a dynamic profile photo may be retrieved or generated based on the location or identifier 616.

Figure 7A:
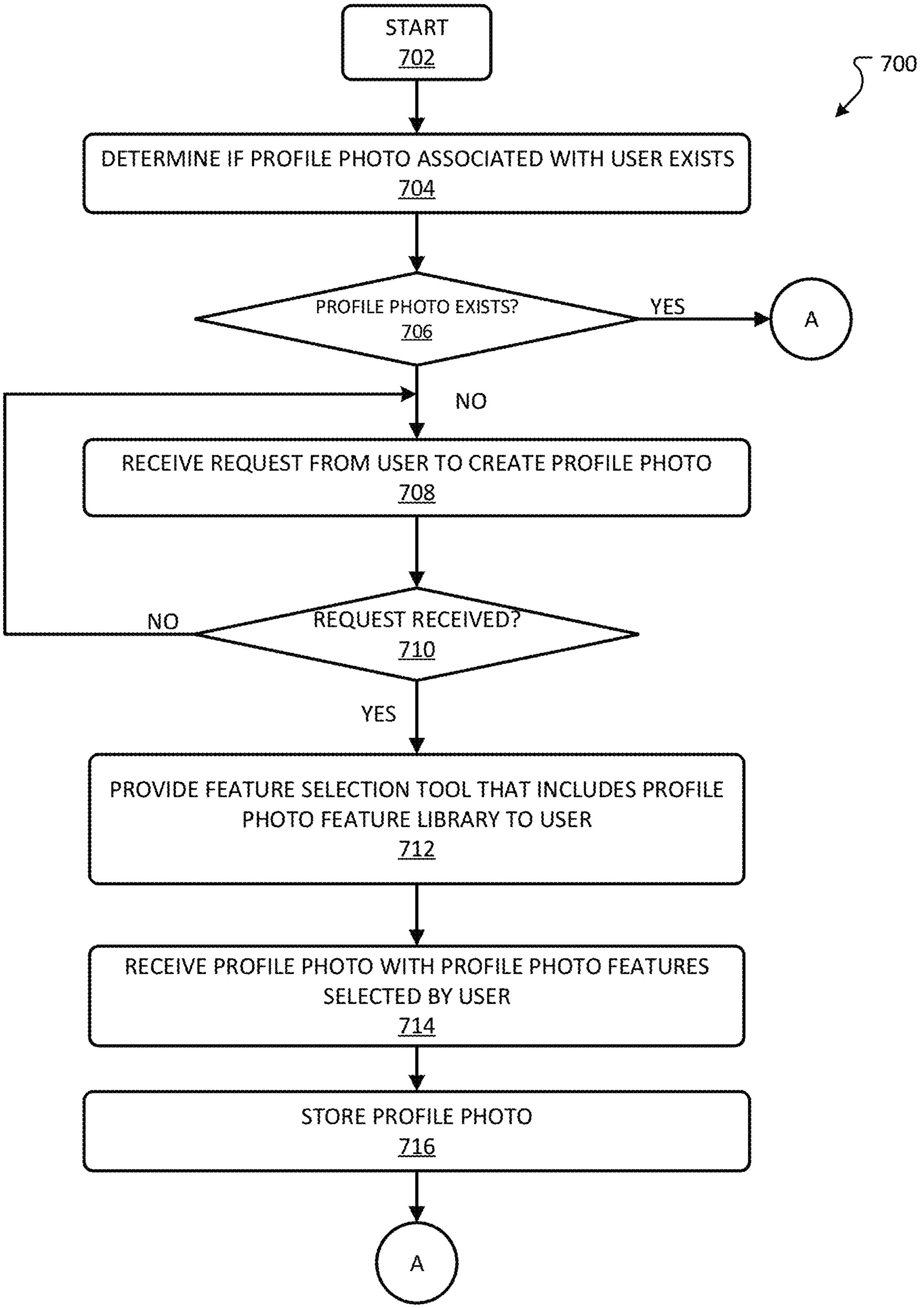
FIGS. 7A and 7B depict details of a first method in accordance with examples of the present disclosure.
Figure 7B:
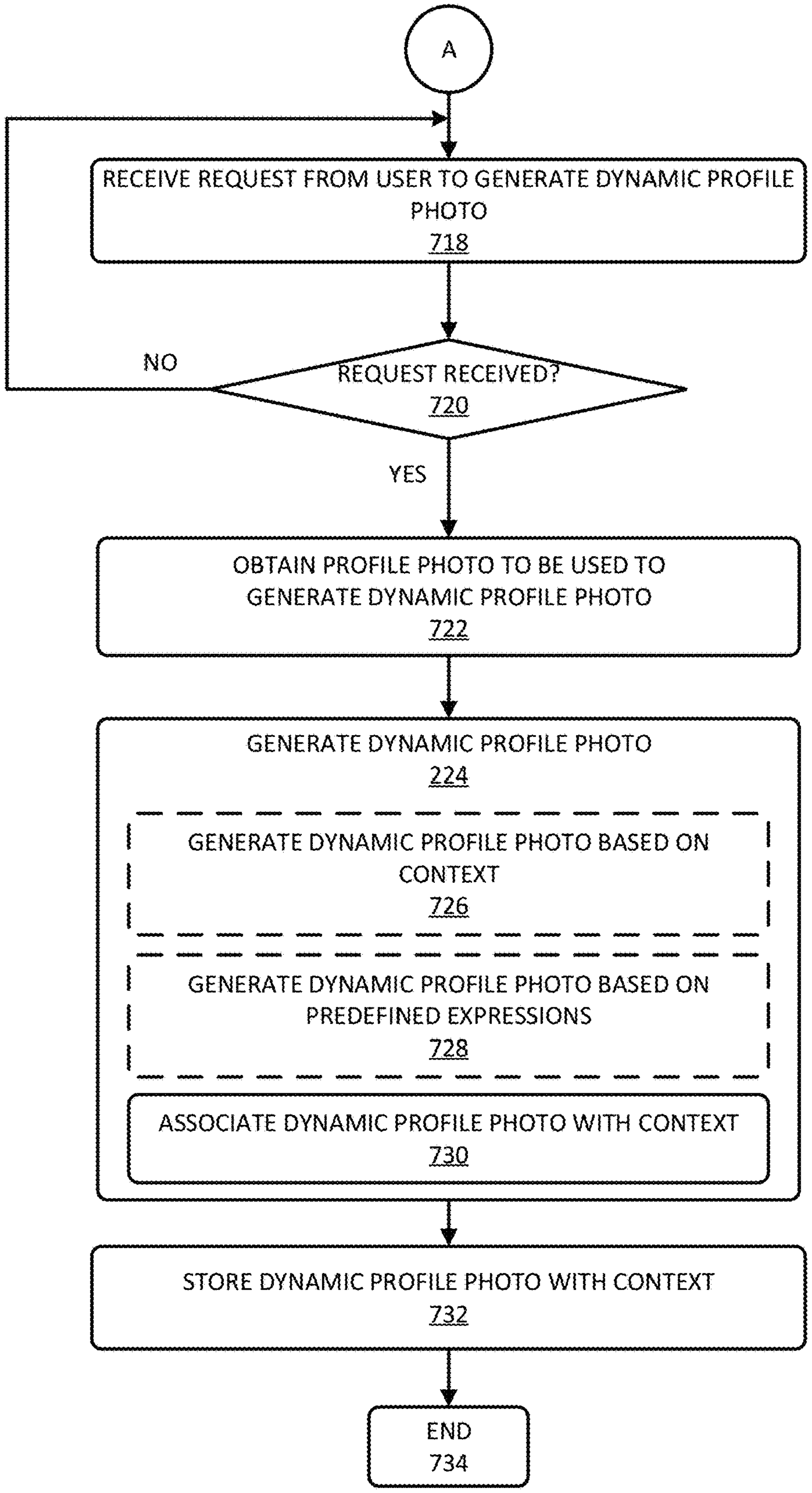

FIGS. 7A and 7B depict a simplified method for generating one or more dynamic profile photos for a user in accordance with examples of the present disclosure is provided. A general order for the steps of a 700 is shown in FIGS. 7A and 7B. Generally, the method 700 starts at 702 and ends at 734. The method 700 may include more or fewer steps or may arrange the order of the steps differently than those shown in FIGS. 7A and 7B. The method 700 can be executed as a set of computer-executable instructions executed by a computer system and encoded or stored on a computer readable medium. In the illustrative aspect, the method 700 is executed by a computing device (e.g., 120) associated with a user (e.g., 110). However, it should be appreciated that aspects of the method 700 may be performed by one or more processing devices, such as a computing device or server (e.g., 120, 150). Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method 700 starts at 702, where flow may proceed to 704. At 704, the computing device 120/150 determines if a profile photo associated with the user 110 exists. If the computing device 120/150 determines that the profile photo exists in operation 706, the method 700 skips ahead to operation 718 in FIG. 7B as shown by the alphanumeric character A in FIGS. 7A and 7B, which is described further below. If, however, the computing device 120/150 determines that the profile photo does not exist in operation 706, the method 700 advances to operation 708.

At operation 708, the computing device 120/150 may receive a request from a user 110 to create a profile photo. If the computing device 120/150 determines that a request has not been received at operation 710, the method 700 loops back to operation 708 to continue awaiting a user request. If, however, the computing device 120/150 determines that a request has been received, the method 700 proceeds to operation 712.

At operation 712, the computing device 120/150 provides a profile photo feature selection tool that includes one or more profile photo features to the user 110, which are stored in a profile photo features library 144/164 for example. It should be appreciated that the profile photo feature library 144 may be received from a profile photo feature library 164 stored at the dynamic profile photo management server 150. The one or more profile photo features may include any facial features or shapes (e.g., a head, hair, eyes, eyebrows, nose, mouth, ears, and wrinkles) and any accessories that may be put on the facial features (e.g., glasses, a hat, earrings, and a nose ring). It should be appreciated that some profile photo features may be preselected as a default.

At operation 714, the computing device 120/150 receives a profile photo with one or more profile photo features selected by the user. Subsequently, at operation 716, the computing device 120/150 stores the profile photo in a profile photo repository 128 of the computing device 120. Additionally, the computing device 120 transmits the user profile photo to the dynamic profile photo management server 150 to be stored in a profile photo repository 158. Subsequently, the method 700 proceeds to operation 718 in FIG. 7B as shown by the alphanumeric character A in FIGS. 7A and 7B, which is described further below.

At operation 718, the computing device 120/150 receives a request from the user to generate a dynamic profile photo. If the computing device 120/150 determines that a request has not been received in operation 720, the method 700 loops back to operation 718 to continue awaiting a user request. If, however, the computing device 120/150 determines that a request has been received in operation 720, the method 700 proceeds to operation 722.

At operation 722, the computing device 120/150 obtains, retrieves, or otherwise receives a profile photo to be used to generate a dynamic profile photo associated with the user 110. As described above, the dynamic profile photo may be stored in the profile photo repository 128 on the computing device 120 and/or the profile photo repository 158 on the dynamic profile photo management server 150.

Subsequently, at operation 724, the computing device 120/150 generates a dynamic profile photo of the user profile photo. To do so, at 726, the computing device 120/150 may obtain context associated with an application, app, environment, program, etc., select a model to use to generate the dynamic profile photo, and then generate the dynamic profile photo based on the context, model, and profile photo. In some examples, a predetermined expression associated with an analyzed or determined context (context parameter and/or context identifier) may be utilized to generate the dynamic profile photo at 728. It should be appreciated that the user 110 may generate or cause to be generated a dynamic profile photo to be presented in certain situations and/or upon the existence of a certain context (e.g., context identifier and/or context parameters).

At operation 730, the computing device 120/150 associates the dynamic profile photo with a context that may trigger a playback of the dynamic profile photo. For example, the context may be associated with receiving a like on a content or receiving a gift during a live video together with a positive analysis of one or more comments. As an example, dynamic profile photo with a smiling or a laughing facial expression may be associated with an action of receiving a like on a content. In another example, a dynamic profile photo with stars for eyes may be associated with a contextual action of receiving a like or heart associated with a profile of a user.

At operation 732, the computing device 120/150 stores the dynamic profile photo with the associated action. For example, the dynamic profile photo may be stored in dynamic profile photo repository 130 of the computing device 120/150. Additionally, the computing device 120 transmits the dynamic profile photo to the dynamic profile photo management server 150 to be stored in a dynamic profile photo repository 160. The method may end at 734.

Figure 8:
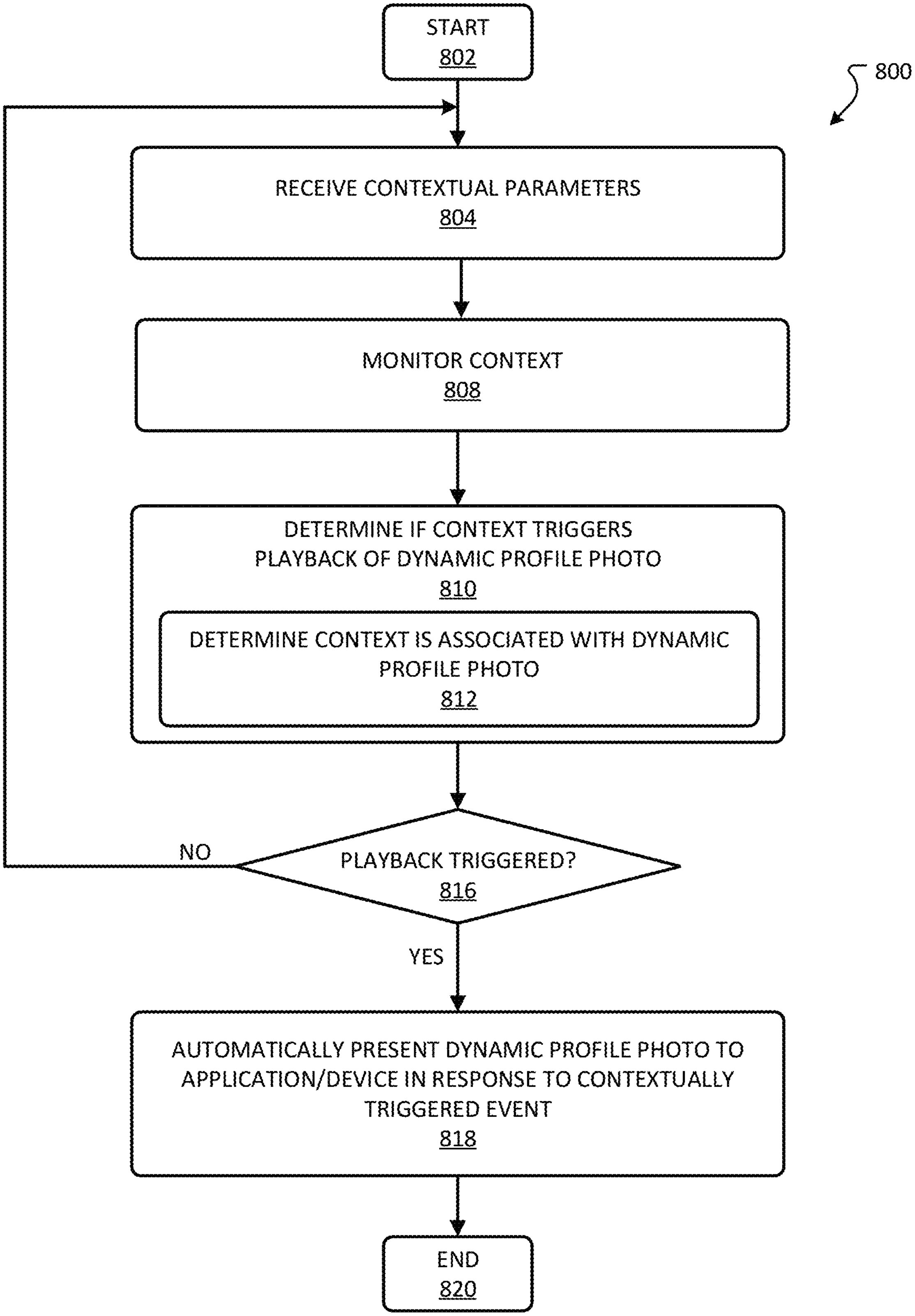
FIG. 8 depicts details of a second method in accordance with examples of the present disclosure.

Referring now to FIG. 8, a detailed method for managing the presentation and/or playback of the dynamic profile photo in accordance with examples of the present disclosure is provided. A general order for the steps of a method 800 is shown in FIG. 8. Generally, the method 800 starts at 802 and ends at 820. The method 800 may include more or fewer steps or may arrange the order of the steps differently than those shown in FIG. 8. The method 800 can be executed as a set of computer-executable instructions executed by a computer system and encoded or stored on a computer readable medium. In the illustrative aspect, the method 800 is executed by a server (e.g., the dynamic profile photo management server 150). However, it should be appreciated that aspects of the method 800 may be performed by one or more processing devices, such as a computing device or server (e.g., 120, 150). Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7B.

The method 800 starts at 802, where flow may proceed to 804. At operation 804, the dynamic profile photo management server 150 receives one or more contextual parameters associated with an application, app, environment, program, user interface, etc. For example, a user may interact with an element or control by liking, commenting, or otherwise reacting to an object posted or otherwise displayed by another user. The objects include any contents (e.g., photos, videos, live stream videos) that are uploaded to a platform serving content and/or another server associated with the dynamic profile management system 100 that is communicatively coupled to the dynamic profile management server 150. At operation 808, the dynamic profile photo management server 150 may monitor the context (e.g., context parameters and/or context identifier). In examples where a context matches an existing context, such as a wink context or a like context, the dynamic profile management server 150 may determine if the detected context triggers a playback of a dynamic profile photo of the host at 810. To do so, at 812 the dynamic profile management server 150 determines if the detected context matches or is otherwise associated with a dynamic profile photo. For example, if the context is for a wink, the dynamic profile management server 150 may determine that the dynamic profile photo 508 matches the wink context.

If the dynamic profile management server 150 determines that a playback is not triggered at operation 816, the method 800 loops back to operation 804 to continue receiving a monitoring context. If, however, the dynamic profile management server 150 determines that a playback of a dynamic profile photo of the host is triggered by the detected context, the method 800 proceeds to operation 818.

At operation 418, the dynamic profile management server 150 automatically presents a dynamic profile photo of the host that is associated with the context. It should be appreciated that, in the illustrative aspect, the associated dynamic profile photo may be automatically presented to the user who triggered the context and/or to the host without receiving any a host input. For example, if a visiting user likes a video clip posted by a host user, the dynamic profile management server 150 may automatically present a dynamic profile photo of the host user that is associated with the like action to the visiting user. In other words, an automatic playback of dynamic profile photo is presented to the visiting user who triggered the action that is associated with the context.

It should be appreciated that, in some aspects, the dynamic profile management server 150 may present an input option to the host user, such that the host user can manually send the dynamic profile photo to the guest user. For example, the input option may be embodied as an image or icon that appears on a display screen of a computing device of the host user. The image or icon may be a short cut to sending a particular dynamic profile photo of the host user that is associated with a specific context. In response, if the host user selects or touches the image or icon, the dynamic profile photo of the host user is sent to the guest user. Once the playback of the dynamic profile photo is presented to the user associated with the content, the method may end at 820. In some examples, the context may be associated with a passage of time or otherwise a lack of interaction between the host and the app, application, environment, user interface etc. Accordingly, the context may match a context associated with the lack of interaction and cause a dynamic profile photo may be displayed to the host user.

It should be appreciated that, although the method 800 is described to be performed by the dynamic profile management server 150, one or more operations of the method 800 may be performed by any computing device, such as the computing device 120.

Figure 9:
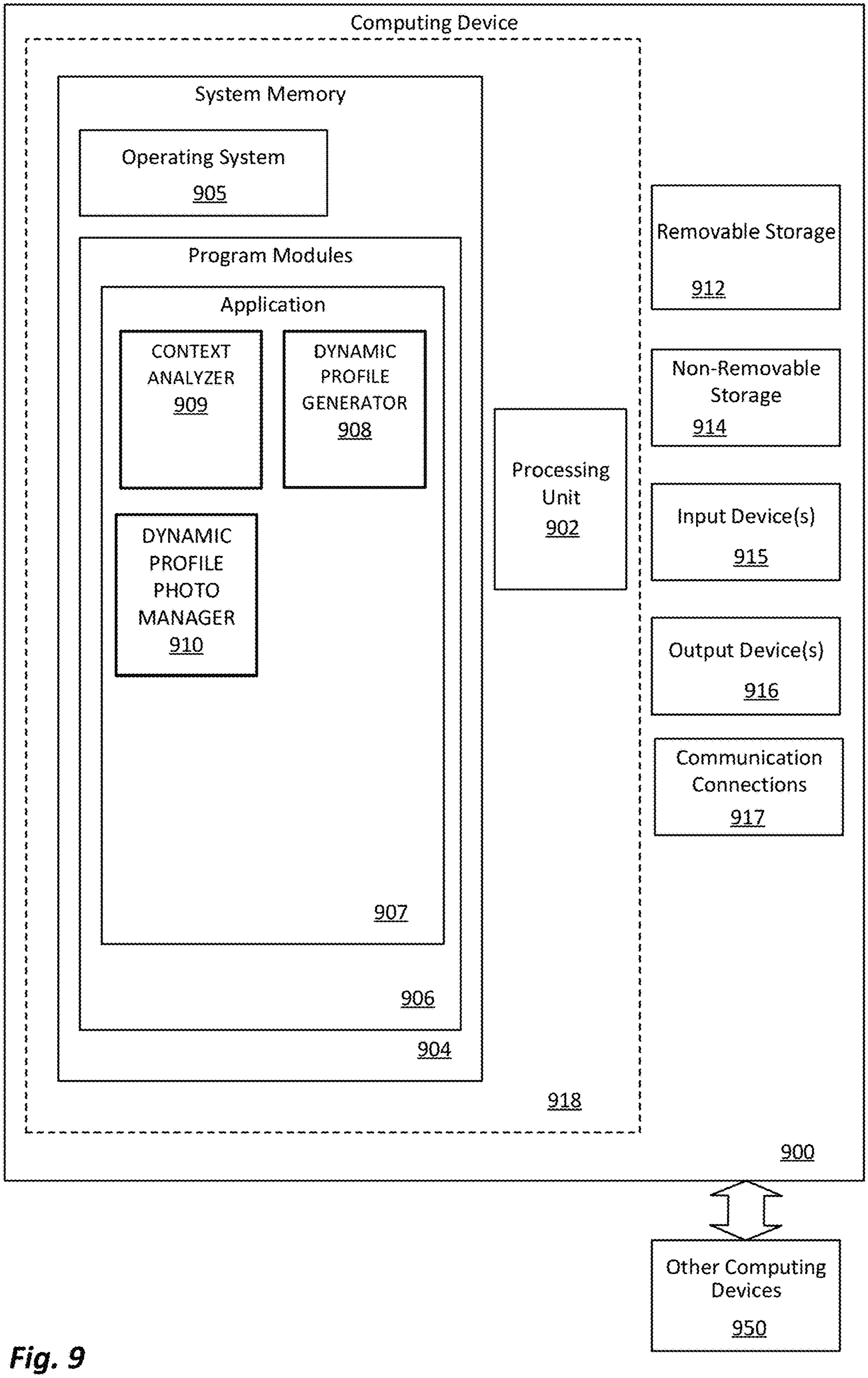
FIG. 9 illustrates a first example of a computing device with which aspects of the disclosure may be practiced.

FIG. 9 is a block diagram illustrating physical components (e.g., hardware) of a computing device 900 with which aspects of the disclosure may be practiced that can perform the operation of generating and presenting dynamic profile photos as described above. The computing device components described below may be suitable for the computing devices described above. For example, the computing device 900 may represent the computing device 120 of FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for performing the various aspects disclosed herein such. The operating system 905, for example, may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 918. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 912 and a non-removable storage device 914.

As stated above, several program modules and data files may be stored in the system memory 904. While executing on the at least one processing unit 902, the program modules 906 may perform processes including, but not limited to, one or more aspects, as described herein. The application 907 includes a dynamic profile photo generator 908, a context analyzer 909, and a dynamic profile photo manager 910, as described in more detail in FIGS. 1-8. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein. Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 900 may also have one or more input device(s) 915 such as a keyboard, a mouse, a pen, a sound or voice input device, a touch or swipe input device, etc. The output device(s) 916 such as a display, speakers, a printer, etc. may also be included. The aforementioned devices are examples and others may be used. The computing device 900 may include one or more communication connections 917 allowing communications with other computing devices 950. Examples of suitable communication connections 917 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 912, and the non-removable storage device 914 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
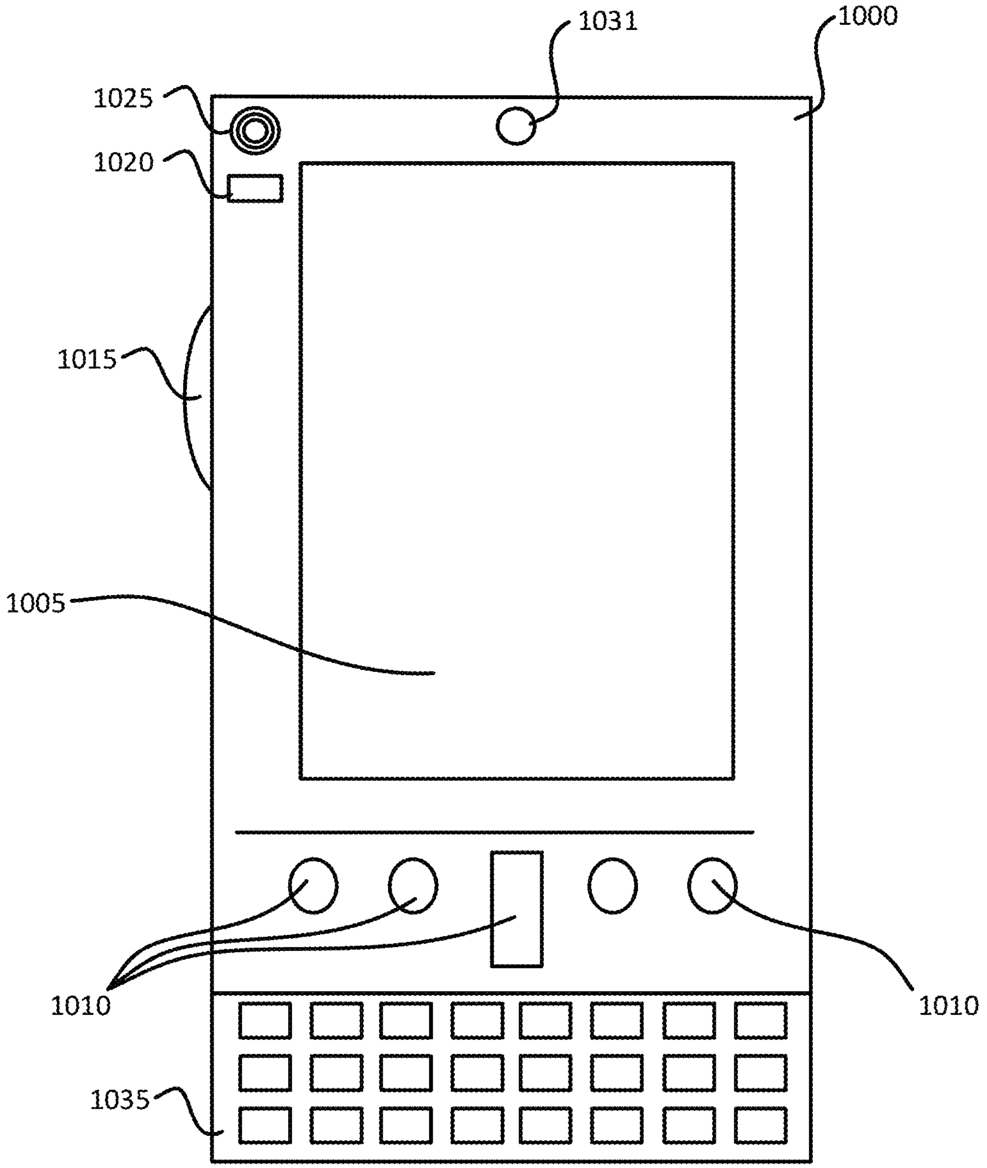
FIGS. 10A and 10B illustrate a second example of a computing device with which aspects of the disclosure may be practiced.
Figure 10B:
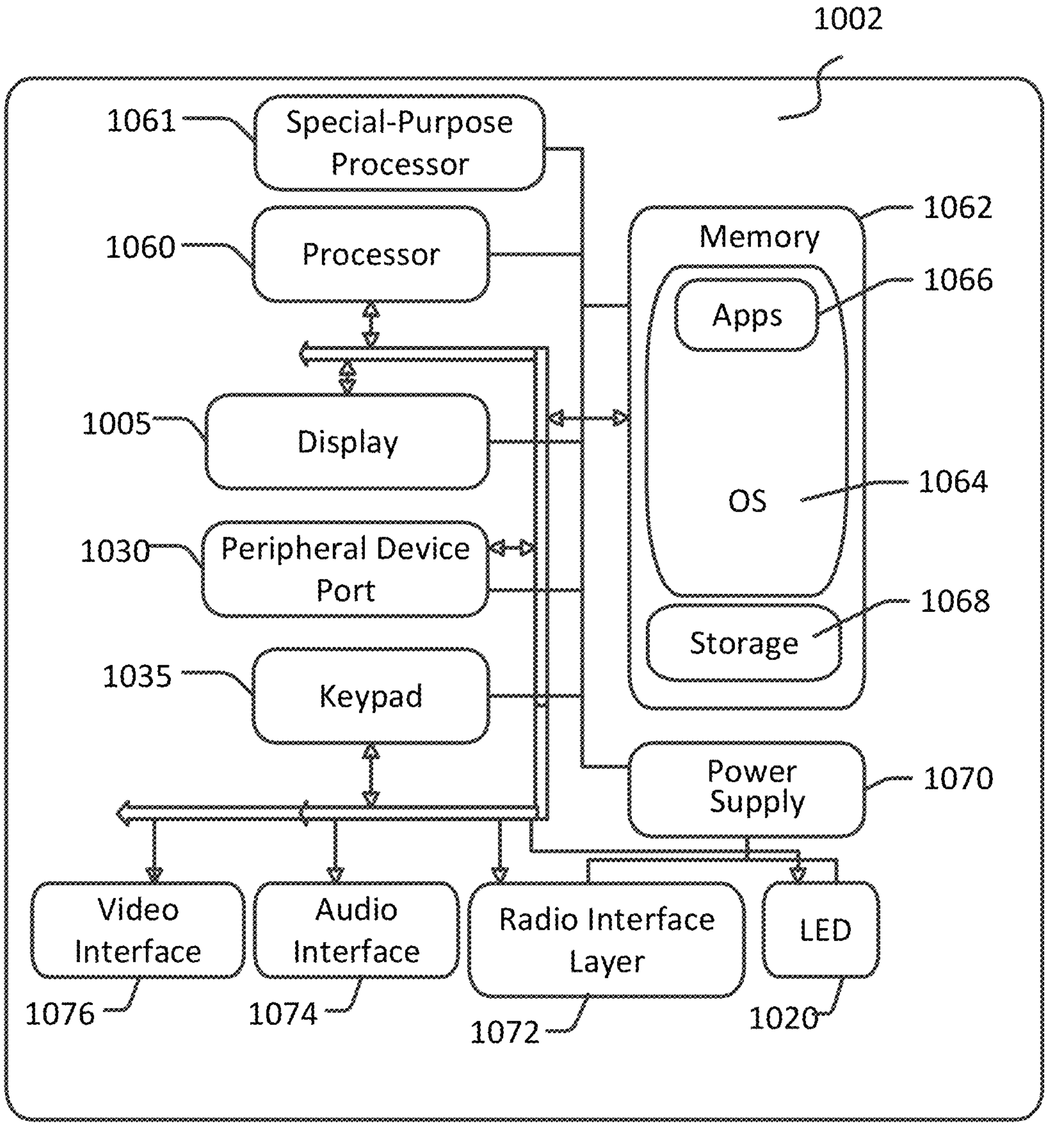

FIGS. 10A and 10B illustrate a computing device or mobile computing device 1000 suitable for performing the various aspects disclosed herein, for example, a mobile telephone, a smart phone, wearable computer (such as a smart watch), a tablet computer, a laptop computer, a smart home appliance, and the like, with which aspects of the disclosure may be practiced that can perform the operation of generating and displaying dynamic profile photos based on context as described above. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1009/1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some aspects. In yet another alternative aspect, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1031 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports 1030, such as an audio input (e.g., a microphone jack), an audio output (e.g., a headphone jack), and a video output (e.g., a HDMI port) for sending signals to or receiving signals from an external source.

FIG. 10B is a block diagram illustrating the architecture of one aspect of computing device, a server, or a mobile computing device. That is, the mobile computing device 1000 can incorporate a system (1002) (e.g., an architecture) to implement some aspects. The system 1002 can implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and/or one or more components supported by the systems described herein. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., dynamic profile photo generator 908, a context analyzer 909, and a dynamic profile photo manager 910, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated configuration, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060/1061 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
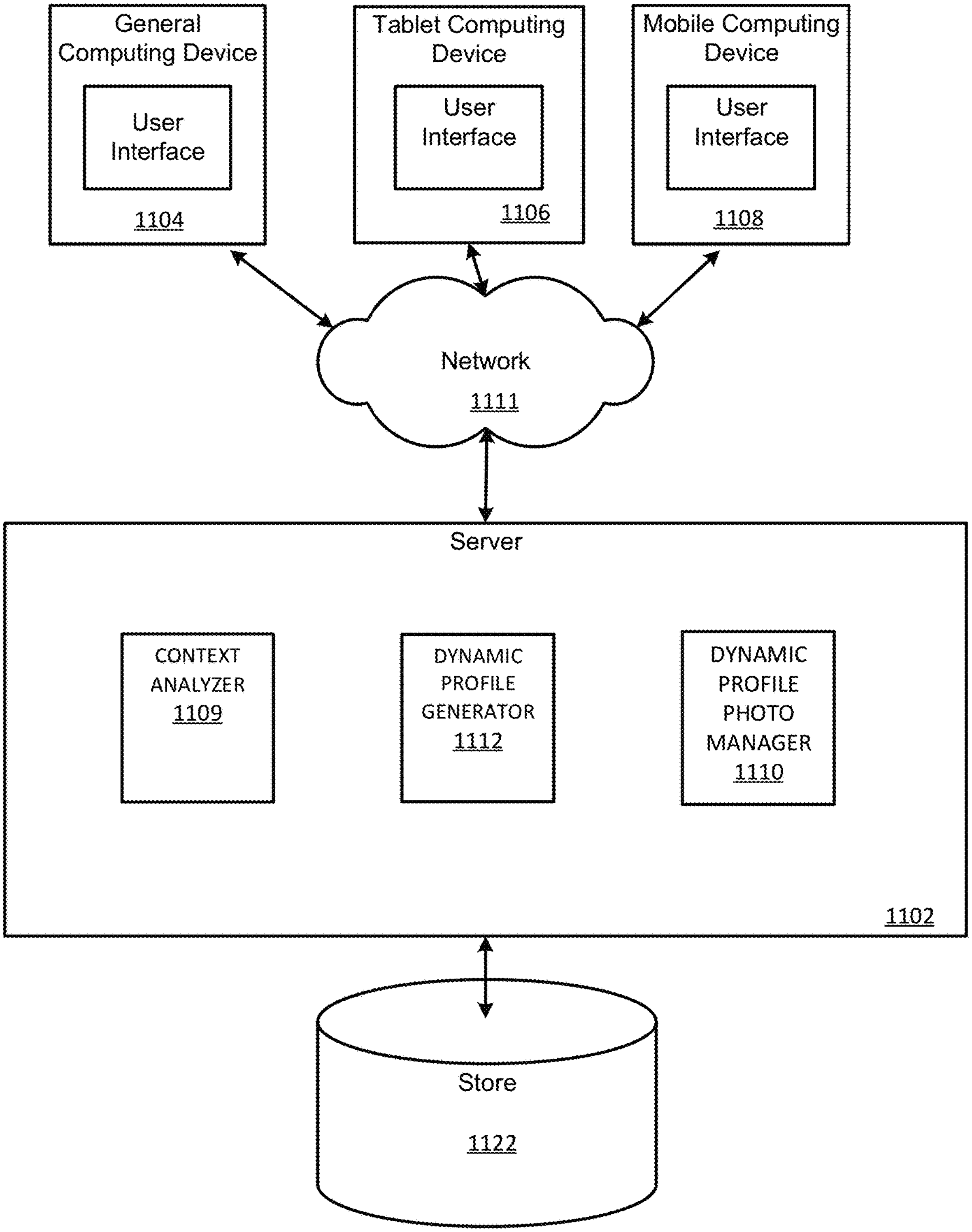
FIG. 11 illustrates at least one aspect of an architecture of a system for processing data in accordance with examples of the present disclosure.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, the computing device 1104, 1106, 1108 may represent the computing device 120 of FIG. 1, and the server device 1102 may represent the dynamic profile photo management server 150 of FIG. 1.

In some aspects, one or more of the context analyzer 1109, dynamic profile generator 1112, and dynamic profile photo manger 1110 may be included in the server device 1102. The server device 1102 may provide data to and from a client computing device such as a personal computer 1104, a tablet computing device 1106 and/or a mobile computing device 1108 (e.g., a smart phone) through a network 1111. By way of example, the computer system described above may be embodied in a personal computer 1104, a tablet computing device 1106 and/or a mobile computing device 1108 (e.g., a smart phone). Any of these aspects of the computing devices may obtain content from the store 1122, in addition to receiving graphical data useable to be either pre-processed at a graphic-originating system, or post-processed at a receiving computing system. The content store may include a profile file repository, dynamic profile photo repository, a profile photo feature library, and/or a context repository.

FIG. 11 illustrates an exemplary mobile computing device 1108 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases “at least one,” “one or more,” “or,” and “and/or” are open-ended expressions that are both conjunctive and disjunctive in operation. For example, each of the expressions “at least one of A, B and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B and C together.

The term “a” or “an” entity refers to one or more of that entity. As such, the terms “a” (or “an”), “one or more,” and “at least one” can be used interchangeably herein. It is also to be noted that the terms “comprising,” “including,” and “having” can be used interchangeably.

The term “automatic” and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be “material.”

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving case, and/or reducing cost of implementation.

The present disclosure relates to systems and methods for generating and presenting dynamic profile photos based on contextual information acquired from an application, app, environment, user interface, etc., and displaying such dynamic profile photo according to at least the examples provided in the sections below:

(A1) In one aspect, some examples include a method for managing a presentation of a dynamic profile photo. The method may include: receiving contextual information associated with one or more users; determining that the contextual information is consistent with a predetermined contextual action; identifying a dynamic profile photo associated with the predetermined contextual information; and presenting, in response to the determination that the contextual information is consistent with the predetermined contextual action, the dynamic profile photo to the one or more users.

(A2) In some examples of A1, the method further includes: generating one or more dynamic profile photos based on the received contextual information; and associating the one or more dynamic profile photos with one or more predetermined contextual actions.

(A3) In some examples of A1-A2, the contextual information includes text associated with one or more comments provided by a user of the one or more users.

(A4) In some examples of A1-A3, the contextual information includes an interaction with at least one of a control or element displayed at a graphical user interface.

(A5) In some examples of A1-A4, the method further includes: analyzing the received contextual information to identify one or more parameters; based on the one or more parameters, identifying a context identifier; and identifying the dynamic profile photo based on the identified context identifier.

(A6) In some examples of A1-A5, presenting the dynamic profile photo includes automatically presenting the dynamic profile photo to a user associated with the dynamic profile photo.

(A7) In some examples of A1-A6, automatically presenting the dynamic profile photo comprises: automatically updating a profile photo of a user associated with the dynamic profile photo, and presenting the dynamic profile photo to the user.

(A8) In some examples of A1-A7, the method further includes: presenting a first dynamic profile photo to a first user of the one or more users; and presenting a second dynamic profile photo to a second user of the one or more users, wherein the first dynamic profile photo is different than the second dynamic profile photo.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for managing a presentation of a dynamic profile photo, the method comprising:

receiving contextual information associated with one or more first users;

determining that the contextual information is consistent with a predetermined contextual action;

identifying a dynamic profile photo associated with the predetermined contextual information, wherein the dynamic profile photo comprises an animation of a user avatar of a second user; and presenting, in response to the determination that the contextual information is consistent with the predetermined contextual action, the dynamic profile photo to the one or more first users; wherein the dynamic profile photo is presented in a profile area associated with the second user, and the contextual information is presented in comment areas.

2. The method of claim 1, further comprising:

generating one or more dynamic profile photos based on the received contextual information; and associating the one or more dynamic profile photos with one or more predetermined contextual actions.

3. The method of claim 1, wherein the contextual information includes text associated with one or more comments provided by a user of the one or more first users.

4. The method of claim 1, wherein the contextual information includes an interaction with at least one of a control or element displayed at a graphical user interface.

5. The method of claim 1, further comprising:

analyzing the received contextual information to identify one or more parameters;

based on the one or more parameters, identifying a context identifier; and identifying the dynamic profile photo based on the identified context identifier.

6. The method of claim 1, wherein presenting the dynamic profile photo includes automatically presenting the dynamic profile photo to a user associated with the dynamic profile photo.

7. The method of claim 6, wherein automatically presenting the dynamic profile photo comprises:

automatically updating a profile photo of a user associated with the dynamic profile photo; and presenting the dynamic profile photo to the user.

8. The method of claim 1, further comprising:

presenting a first dynamic profile photo to a first user of the one or more first users; and presenting a second dynamic profile photo to another first user of the one or more first users, wherein the first dynamic profile photo is different than the second dynamic profile photo.

9. A computing device for presenting a dynamic profile photo, the computing device comprising:

a processor; and a memory having a plurality of instructions stored thereon that, when executed by the processor, causes the computing device to:

receive contextual information associated with one or more first users;

determine that the contextual information is consistent with a predetermined contextual action;

identify a dynamic profile photo associated with the predetermined contextual information, wherein the dynamic profile photo comprises an animation of a user avatar of a second user; and present, in response to the determination that the contextual information is consistent with the predetermined contextual action, the dynamic profile photo to the one or more first users; wherein the dynamic profile photo is presented in a profile area associated with the second user, and the contextual information is presented in comment areas.

10. The computing device of claim 9, wherein the computing device is further configured to:

generate one or more dynamic profile photos based on the received contextual information; and associate the one or more dynamic profile photos with one or more predetermined contextual actions.

11. The computing device of claim 9, wherein the contextual information includes text associated with one or more comments provided by a user of the one or more first users.

12. The computing device of claim 9, wherein the contextual information includes an interaction with at least one of a control or element displayed at a graphical user interface.

13. The computing device of claim 9, wherein the computing device is further configured to:

analyze the received contextual information to identify one or more parameters;

based on the one or more parameters, identify a context identifier; and identify the dynamic profile photo based on the identified context identifier.

14. The computing device of claim 13, wherein presenting the dynamic profile photo includes automatically presenting the dynamic profile photo to a user associated with the dynamic profile photo.

15. The computing device of claim 13, wherein the computing device is further configured to:

automatically update a profile photo of a user associated with the dynamic profile photo; and present the dynamic profile photo to the user.

16. The computing device of claim 9, wherein the computing device is further configured to:

present a first dynamic profile photo to a first user of the one or more first users; and present a second dynamic profile photo to another first user of the one or more first users, wherein the first dynamic profile photo is different than the second dynamic profile photo.

17. A non-transitory computer-readable medium storing instructions for presenting a dynamic profile photo, the instructions when executed by one or more processors of a computing device, cause the computing device to:

receive contextual information associated with one or more first users;

determine that the contextual information is consistent with a predetermined contextual action;

identify a dynamic profile photo associated with the predetermined contextual information, wherein the dynamic profile photo comprises an animation of a user avatar of a second user; and present, in response to the determination that the contextual information is consistent with the predetermined contextual action, the dynamic profile photo to the one or more first users;

wherein the dynamic profile photo is presented in a profile area associated with the second user, and the contextual information is presented in comment areas.

18. The non-transitory computer-readable medium of claim 17, wherein the instructions when executed by the one or more processors further cause the computing device to:

generate one or more dynamic profile photos based on the received contextual information; and associate the one or more dynamic profile photos with one or more predetermined contextual actions.

19. The non-transitory computer-readable medium of claim 17, wherein the contextual information includes text associated with one or more comments provided by a user of the one or more first users.

20. The non-transitory computer-readable medium of claim 17, wherein the contextual information includes an interaction with at least one of a control or element displayed at a graphical user interface.

* * * * *